United States Patent
Lui et al.

(10) Patent No.: US 7,072,414 B1
(45) Date of Patent: Jul. 4, 2006

(54) GAUSSIAN MINIMUM SHIFT KEYING (GMSK) PRECODING COMMUNICATION METHOD

(75) Inventors: Gee L. Lui, Westminster, CA (US); Kuang Tsai, Santa Ana, CA (US)

(73) Assignee: The Aerospace Corporation, El Segundo, CA (US)

( * ) Notice: Subject to any disclaimer, the term of this patent is extended or adjusted under 35 U.S.C. 154(b) by 0 days.

(21) Appl. No.: 09/390,966

(22) Filed: Sep. 7, 1999

(51) Int. Cl.
  *H04L 27/10* (2006.01)
  *H04L 27/12* (2006.01)
  *H04L 27/14* (2006.01)
  *H04L 25/34* (2006.01)

(52) U.S. Cl. .................... 375/274; 375/305; 375/335; 375/290

(58) Field of Classification Search ............. 375/274, 375/340, 305, 309, 279, 272, 303, 334, 336, 375/316, 295, 290, 291; 329/300; 332/100
See application file for complete search history.

(56) References Cited

U.S. PATENT DOCUMENTS

| | | | | | |
|---|---|---|---|---|---|
| 4,426,710 | A | * | 1/1984 | Pommier | 375/291 |
| 5,142,551 | A | * | 8/1992 | Borth et al. | 375/219 |
| 5,379,324 | A | * | 1/1995 | Mueller et al. | 375/340 |
| 5,712,877 | A | * | 1/1998 | Ho et al. | 375/284 |
| 5,724,390 | A | * | 3/1998 | Blaker et al. | 375/229 |
| 5,841,817 | A | * | 11/1998 | Krieger et al. | 375/340 |
| 6,148,040 | A | * | 11/2000 | Nguyen et al. | 375/326 |
| 6,185,259 | B1 | * | 2/2001 | Dent | 375/261 |
| 6,263,029 | B1 | * | 7/2001 | Alard et al. | 375/340 |
| 6,320,914 | B1 | * | 11/2001 | Dent | 375/302 |
| 6,411,661 | B1 | * | 6/2002 | Nguyen et al. | 375/336 |
| 6,430,212 | B1 | * | 8/2002 | Alisobhani et al. | 375/141 |

OTHER PUBLICATIONS

Gee L. Lui, Threshold Detection Performance of GMSK Signal With BT=0.5, IEEE 1998, pp. 515-519 vol. 2.*
Pierre A. Laurent, "Exact and Approximate Construction of Digital Phase Modulations by Superposition of Amplitude Modulated Pulses (AMP)," IEEE Transactions on Communications, IEEE, vol. 34 (No. 2), p. 150-160, (Feb. 7, 1986).
Umberto Mengali and Michele Morelli, "Decomposition of M-ary CPM Signals into PAM Waveforms," IEEE Transactions on Information Theory, IEEE, vol. 41, (No. 5), p. 1265-1271, (Sep. 7, 1995).
Ghassan Kawas Kaleh, "Simple Coherent Receivers for Partial Response Continuous Phase Modulation," IEEE Journal on Selected Areas of Communications, IEEE, vol. 7 (No. 9), p. 1427-1436, (Dec. 7, 1989).
Gee L. Lui, "GMSK Modulation,".

* cited by examiner

*Primary Examiner*—Tesfaldet Bocure
(74) *Attorney, Agent, or Firm*—Derrick Michael Reid

(57) ABSTRACT

A premodulation precoding method precodes a data sequence in a Gaussian minimum shift keying (GMSK) modulator to improve the bit error rate performance of a coherent Viterbi receivers generating estimates of the communicated data sequence without the use of differential decoding while preserving the spectrum of 2-ary and 4-ary GMSK signals over a wide range of bandwidth time products.

19 Claims, 2 Drawing Sheets

PRECODED COHERENT GMSK COMMUNICATION SYSTEM

BER PERFORMANCE OF PRE-CODED
AND UN-CODED GMSK WITH BT = 1/3

GAUSSIAN MINIMUM SHIFT KEYING (GMSK) PRECODING COMMUNICATION METHOD

FIELD OF THE INVENTION

The invention relates to the field of continuous phase modulation communications. More particularly, the present invention relates to a Gaussian minimum shift keying communication method for communicating a precoded digital data stream for improved performance.

BACKGROUND OF THE INVENTION

Digital communication systems transmit data by various carrier modulation techniques. The spectrum of a digital signal can be controlled and made compact by envelope filtering or phase domain filtering. Envelope filtering filters the baseband data stream prior to upconversion to the carrier frequency and power amplification. Envelope filtering for controlling out of band power of the transmitted signal, can be found in many operational communication systems. However, the power amplifier in the transmitter must be linearized or backed off to prevent spectral regrowth of the filtered signal. The more efficient phase domain filtering approach controls the signal spectrum by frequency modulating the filtered signal onto a carrier frequency to form a continuous phase modulated (CPM) signal. The CPM signal has a constant envelope so that the power amplifier can be operated at maximum output power without affecting the spectrum of the filtered signal.

Gaussian minimum shift keying (GMSK) is a form of continuous phase modulation having compact spectral occupancy by choosing a suitable bandwidth time product (BT) parameter in a Gaussian filter. The constant envelope makes GMSK compatible with nonlinear power amplifier operation without the concomitant spectral regrowth associated with non-constant envelope signals. These attributes render GMSK an attractive modulation scheme in all high throughput frequency division multiple access satellite communication systems where only a limited system bandwidth is available with the transmitters operating at maximum power output efficiency.

Data bits are formatted, for example, by non-return to zero (NRZ) formatting prior to Gaussian filtering, carrier modulation and power amplification. The formatted data is transmitted within data symbols of an M-ary alphabet of M possible data symbols. An M-ary GMSK signal is defined by the complex envelope described in terms of symbol energy E, symbol period T, carrier phase $\theta_c$ and phase pulse g(t) using a modulation index h and the equally probable NRZ data symbols belong to an M-ary alphabet. The GMSK phase pulse g(t) originates from a frequency response f(t) of the Gaussian smoothing filter with a single-sided 3 dB bandwidth B, time truncated to a time interval of LT, where L is an integer. For Gaussian filters with small BT products, the memory length L is approximately an integer greater than or equal to 1/BT. The length L is the number of elapsed symbol periods for the GMSK signal to accrue a full phase change due to a single input symbol and hence represents the memory of the GMSK signal. A GMSK signal with memory L greater than one is termed a partial response GMSK signal. The GMSK signal is communicated to a GMSK receiver subject to interference and additive white Gaussian noise (AWGN).

An optimum GMSK receiver for an additive white Gaussian noise channel demodulates the received signal by coherent demodulation into estimated output data stream using a local carrier reference. The receiver demodulates by filtering the received signal using a bank of Laurent filters that filter the demodulated received signal into a symbol sequence. A Viterbi decoder searches the symbol sequence for the most probable transmitted data sequence as an estimate of the original NRZ formatted data stream. A typical coherent receiver for 2-ary GMSK signal is based on a pulse amplitude modulation (PAM) representation of 2-ary CPM signals using Laurent matched filters matched to the amplitude modulated pulses in the PAM representation, and further employs the Viterbi algorithm to optimally demodulate the symbol sequence. For 2-ary GMSK transmitters with BT=¼ and with a channel Bit Error Rate (BER) of 0.01, or more, a GMSK receiver consisting of only two matched Laurent filters and a 4-state Viterbi algorithm can nearly achieve the performance of coherent binary phase shift Keying (BPSK) signaling communications. Amplitude modulated pulses have also been extended to PAM representation for 4-ary CPM signals.

In demodulating 2-ary and 4-ary GMSK signals using the Viterbi algorithm, a differential decoder is necessary to resolve data bit ambiguities while providing a degraded BER with respect to the absolute phase demodulation. It is desirable to reduce the BER. For noisy channels, the differential decoder yields poor bit error rate performance. The Viterbi algorithm typically employs a sliding window in the demodulation process where the width of the sliding window represents the demodulation memory or delay. The surviving state sequence $U_n = (S_n, S_{n-1}, \ldots, S_{n-w})$ produced by the sliding window Viterbi algorithm at any stage n depends on all the demodulated symbols $\{d_k; 0 \leq k \leq n\}$ prior to that stage, where $S_k = d_0 + d_1 + \ldots + d_k$. The term W is the size of the sliding window that is dictated by the memory length L of the underlying GMSK signal. This intrinsic data dependency of the survivor state sequences $U_n$ disadvantageously requires a differential decoder operation in the receiver when deciding on the actual demodulated symbol from successive survivors of the Viterbi algorithm resulting in a differential bit error rate (BER) degradation. These disadvantages are solved or reduced by the present invention.

SUMMARY OF THE INVENTION

An object of the invention is to improve the bit error rate (BER) of continuous phase modulation communication systems.

Another object of the invention is to provide a preceding method for continues phase modulation communication systems.

Yet another object of the invention is to provide a preceding method for a continuous phase modulation and coherent demodulation communication system to reduce the BER while eliminating the need for differential decoders in a receiver.

Still another object of the invention is to provide a preceding method for a Gaussian minimum shift keying (GMSK) continuous phase modulation and coherent demodulation communication system to reduce the BER while eliminating the need for differential decoders in a receiver.

The present invention is directed to a data preceding algorithm implemented in a modulator of a transmitter to substantially improve the resulting BER performance of the continuous phase modulated (CPM) receivers, such as, Gaussian minimum shift keying (GMSK) receivers without the use of differential decoders while preserving the spectral occupancy of the GMSK signals. The preceding algorithm offers performance improvement for both 2-ary and 4-ary coherently demodulated GMSK signals. The performance improvement afforded by the precoding algorithm is up to 2.5 dB for coherent demodulation of 2-ary and 4-ary GMSK signals. The preceding algorithm may be implemented using a lookup table in the modulator circuitry without altering the desired spectral occupancy of the non-precoded GMSK signals.

Precoding improves the BER performance for coherent demodulators of the 2-ary and 4-ary GMSK signals implemented using a pulse amplitude modulated signal subject to the Viterbi algorithm. The precoding algorithm encodes the source NRZ data symbols $\{d_n\}$ prior to the GMSK modulation so that the cumulative phase of the precoded symbols $\{\alpha_n\}$ is identical to the absolute phase of the source NRZ symbols at every stage of the Viterbi algorithm, that is, $\pi h(\alpha_0+\alpha_1+ \ldots +\alpha_n)=\pi h d_n$, where h denotes modulation index. In the Viterbi algorithm, this preceding process produces a set of survivor sequences $\{U_n=(S_n, S_{n-1}, \ldots S_{n-w})\}$ satisfying the condition $S_k=d_k$ at every stage k, thus making the differential decoder operation unnecessary. The precoded symbols have the same statistics as the source symbols so that the transmit spectrum of the GMSK signal is preserved. The BER is reduced using the precoding method for GMSK signals with memory of L. The memory L of a GMSK signal is related to the bandwidth time product BT of the underlying Gaussian filter by L=1/BT, where B is the single-sided 3 dB filter bandwidth in hertz. Depending upon the channel bit error rate required, the preceding method will render a signal to noise ratio (SNR) improvement of up to 2.5 dB over the same modem that demodulates GMSK signals without preceding. The proposed precoding method may also be applied to other 2-ary and 4-ary CPM signals. The only change required for these cases is to modify the pulse amplitude modulation (PAM) filters of the receiver. The preceding method encodes the source symbols $\{d_n\}$ prior to the GMSK modulation so that the resulting channel symbols $\{\alpha_n\}$ will render an optimal pseudo symbol sequence requiring no differential decoding with improved bit error rates. These and other advantages will become more apparent from the following detailed description of the preferred embodiment.

DETAILED DESCRIPTION OF THE PREFERRED EMBODIMENT

Figure 1:
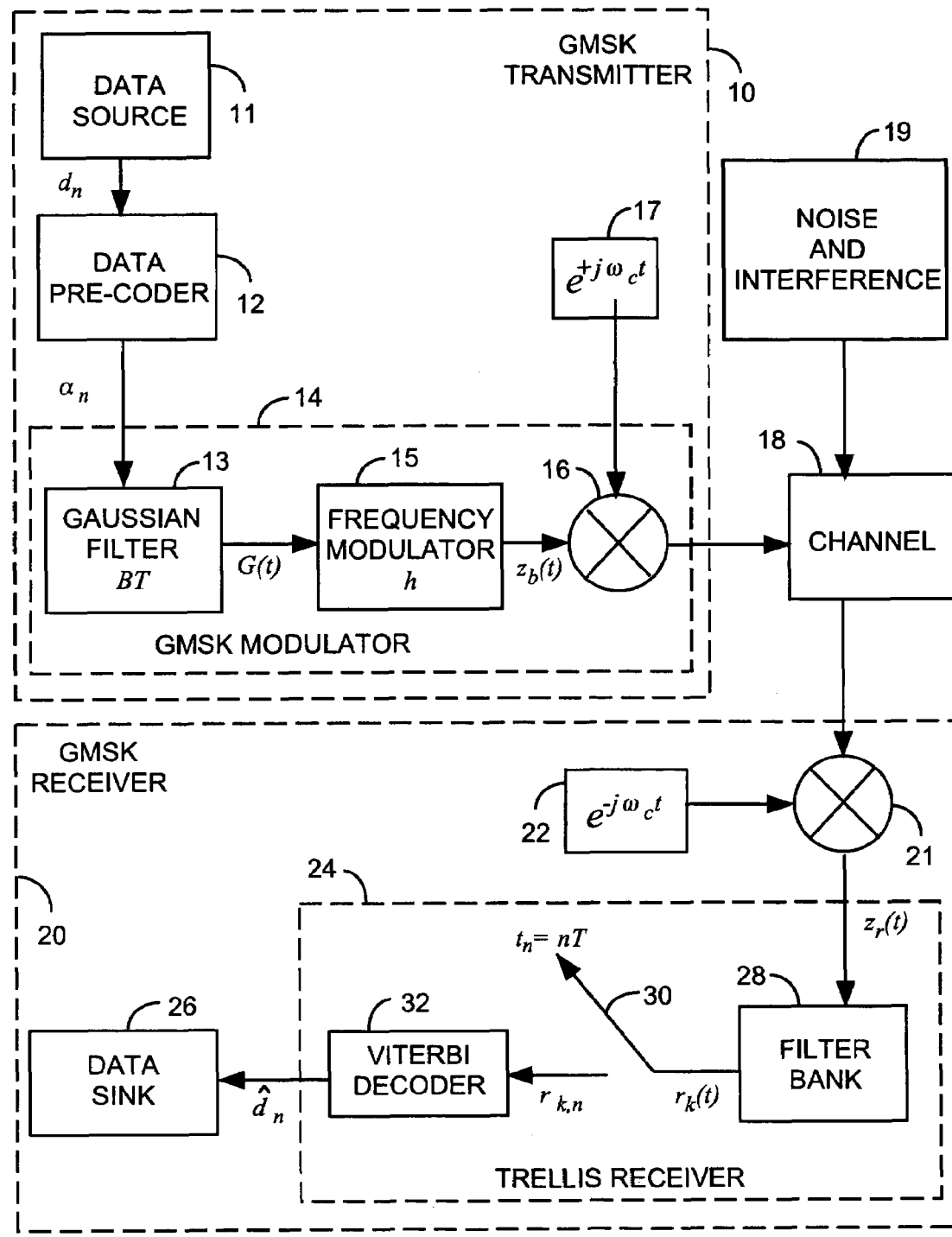
FIG. 1 is a block diagram of a precoded coherent Gaussian minimum shift keying (GMSK) communication system.

An embodiment of the invention is described with reference to the figures using reference designations as shown in the figures. Referring to FIG. 1, a baseband representation of an M-ary Gaussian minimum shift keying (GMSK) communication system is simplistically shown for convenience to have ideal symbol timing and carrier phase synchronization. The GMSK transmitter 10 comprises a data source 11, a data precoder 12, and a GMSK modulator 14. The data source 11 continuously generates M-ary NRZ data symbols $d_n$ chosen from an M-ary alphabet set $\{\pm1, \pm3, \ldots \pm(M-1)\}$.

These source symbols $d_n$ are then precoded by the data precoder 12 into a precoded symbol sequence $\alpha_n$ that is in turn modulated by the GMSK modulator 14. The GMSK modulator 14 includes a Gaussian filter 13, a frequency modulator 15, and a frequency converter 16. The Gaussian filter 13 is defined by a bandwidth time product (BT) that may be, for example, ⅓, where B is the one sided 3 dB bandwidth in hertz of the Gaussian filter 13 and T is the data symbol duration in seconds. For M-ary GMSK signals with h=1/M, both main lobe bandwidth and sidelobe amplitude decrease with a decreasing BT. The Gaussian filter 13 provides a Gaussian filter output G(t) expressed as an accumulative filter sum response of the input sequence of precoded symbols $\alpha_n$.

$$G(t) = \sum_n \alpha_n \cdot f(t - nT)$$

The term f(t) is the well-known GMSK frequency pulse that is a function of the BT product and is essentially zero except over a time interval of duration LT, where L is an integer representing the memory of the Gaussian filter 13. The memory length L is greater than or equal to one (L≧1). The frequency modulator 15 receives and modulates the Gaussian filter output G(t) by a predetermined modulation index h that may be, for example, ½. In general, lowering the modulation index h while keeping the BT product constant will reduce spectral occupancy. Preferably, the modulation index is set to h=1/M. The frequency modulator 15 transforms the Gaussian filter output G(t) into a continuous phase modulated baseband GMSK signal $Z_b(t)$. The signal amplitude of $\sqrt{(2E/T)}$ is taken as one.

$$z_b(t) = \exp\left\{j\pi h \cdot \int_{-\infty}^{t} G(\tau) d\tau\right\} = \exp\left\{j\pi h \sum_n \alpha_n \cdot \int_{-\infty}^{t} f(\tau - nT) d\tau\right\} \equiv \exp\left\{j\pi h \sum_n \alpha_n \cdot g(t - nT)\right\}$$

The term g(t), which is the integral of the GMSK frequency pulse f(t), is the well-known GMSK phase pulse.

The baseband GMSK signal $Z_b(t)$ is then upconverted by the converter 16 using a carrier reference 17 and then transmitted over a communication channel 18 subject to additive white Gaussian noise (AWGN) and potential interference 19. The transmitted GMSK signal, along with noise and interference, is received by a corresponding GMSK receiver 20 equipped with a frequency converter 21. The converter 21 uses a locally generated carrier reference 22 to downconvert the received RF signal into a baseband signal $Z_r(t)$. The received baseband signal $Z_r(t)$ is then processed by a trellis demodulator 24 to provide data estimates $\hat{d}_n$ to a data sink 26. The trellis demodulator 24 includes a filter bank 28, a sampler 30, and a Viterbi decoder 32 implementing a Viterbi algorithm.

The received baseband signal $Z_r(t)$ is first filtered by the filter bank 28 that consists of F matched filters, where F is at most $Q=2^{L-1}$ for 2-ary GMSK signaling, and at most $P=3 \cdot [2^{L-1}]^2$ for 4-ary GMSK signaling. The filters in the filter bank 28 are matched to the Laurent amplitude-modulated pulses of the transmitted baseband GMSK signal $Z_b(t)$, and may be implemented as a matched filter bank or an integrate-and-dump type filter bank. The filter bank 28 provides filtered signals $r_k(t)$ for $0 \leq k \leq F-1$, which are sampled by the sampler 30 at every symbol time instants $t_n=nT$ to produce discrete sample values $r_{k,n}$. These sample values are then processed by the Viterbi decoder 32 to provide the data estimates $\hat{d}_n$ to the data sink 26. In order to produce reliable data estimates $\hat{d}_n$, the processing of the Viterbi decoder 32 must conform to the precoding performed by the data precoder 12 on the data symbols $d_n$ at the transmitter 10. The number of matched filters used in the filter bank 28 also affects the reliability of the data estimates $\hat{d}_n$.

For an N symbol long 2-ary data sequence $\{\alpha_n; 0 \leq n \leq N-1\}$, the baseband GMSK signal $Z_b(t)$ has a Laurent representation.

$$z_b(t) = \exp\left\{j\pi h \cdot \sum_n \alpha_n \cdot g(t-nT)\right\} = \sum_{k=0}^{Q-1} \sum_{n=0}^{N-1} a_{k,n} \cdot h_k(t-nT)$$

The term $Q=2^{L-1}$ is the total number of 2-ary amplitude modulated pulses $\{h_k(t)\}$, and the term $\{a_{k,n}\}$ represents the pseudo-symbols relating to the 2-ary data sequence $\{\alpha_n\}$ through radix-2 digits $\{k_i\}$ for k defined by a summation over the index i with $k_o$ equal to zero.

$$k = \sum_{i=1}^{L-1} k_i \cdot 2^{i-1} \quad a_{k,n} = \exp\left\{j\pi h \cdot \left[\sum_{m=0}^{n} \alpha_m - \sum_{i=0}^{L-1} k_i \cdot \alpha_{n-i}\right]\right\}$$

Each 2-ary amplitude modulated pulse $h_k(t)$ is related to the modulation index h and signal memory L through a generalized phase pulse c(t).

$$h_k(t) = \prod_{i=0}^{L-1} c(t+iT-(1-k_i)LT)$$

$$c(t) = \begin{cases} \sin[\pi h - \pi h g(|t|)]/\sin(\pi h); & |t| \leq LT \\ 0; & |t| \geq LT \end{cases}$$

The amplitude modulated pulse $h_k(t)$ is time limited to the interval $[0, D_kT]$ where $D_k=\min_{0<I<L}\{L(2-k_i)-i\}$, for examples, $D_0=L+1$, and $D_1=L-1$. The optimal trellis demodulator 24 for an N symbol sequence $\{\alpha_n; 0 \leq n \leq N-1\}$ corrupted by additive white Gaussian noise (AWGN) is one that maximizes $2^N$ correlation metrics for $0 \leq m \leq 2^N-1$.

$$\Lambda^{(m)} = Re[<z_r(t), z_m(t)>] = Re[\int_{-\infty}^{\infty} z_r(t) \cdot z_m^*(t) dt]$$

The term $z_m(t)$ denotes the baseband signal associated with the m-th possible sequence, and the term $z_r(t)$ denotes the AWGN corrupted received baseband signal. Expanding $z_m(t)$ in Laurent representation, these correlation metrics can be expressed in terms of the pseudo symbols $a_{k,n}^{(m)}$.

$$\Lambda^{(m)} = \sum_{n=0}^{N-1} \lambda^{(m)}(n)$$

$$\lambda^{(m)}(n) \equiv Re\left[\sum_{k=0}^{Q-1} r_{k,n} \cdot a_{k,n}^{(m)*}\right]$$

$$r_{k,n} \equiv \int_{-\infty}^{\infty} z_r(t) \cdot h_k(t-nT) dt = [z_r(t) * h_k(-t)]_{t=nT}$$

The term $a_{k,n}^{(m)}$ denotes the pseudo symbols associated with the m-th possible sequence. By supplying the sampled matched filter output $r_{k,n}$ to the Viterbi decoder 32, which produces an optimal pseudo symbol sequence $\{a_{0,n}; 0 \leq n \leq N-1\}$ that maximizes $\Lambda$, the best estimate of the transmit sequence $\{\alpha_n\}$ can then be found. The trellis demodulator is simplified by retaining the first F matched filters $\{h_k(t); 0 \leq k \leq F-1\}$ in the $\lambda$ equation, where F is often confined to power of two due to the batch nature of the filter duration $\{D_k\}$, e.g., $D_2=D_3=L-2$, $D_4=D_5=D_6=D_7=L-3$. For the case of F=2, the first two 2-ary matched-filters and the corresponding $\lambda$ equation are explicitly given by matched filter equations $h_0$ and $h_1$.

$$h_0(t) = \prod_{i=1}^{L} c(t-iT)$$

$$h_1(t) = h_0(t) \cdot \frac{c(t+T)}{c(t-(L-1)T)}$$

$$\lambda(n) \equiv Re\lfloor r_{0,n} \cdot a_{0,n}^* + r_{1,n} \cdot a_{1,n}^* \rfloor$$

The optimal pseudo symbol sequence produced by the Viterbi decoder 32 at any stage n inevitably involves all the demodulated symbols prior to that stage.

$$\alpha_{0,n} = J^{(\alpha_0+\alpha_1+\ldots+\alpha_n)}$$

$$\alpha_{1,n} = J^{\alpha_n} \cdot \alpha_{0,n-2}$$

The term $J=\exp(j\pi h)$ depends on the modulation index h, and is $J=j$ for the case of $h=\frac{1}{2}$. This intrinsic data dependency requires a differential decode operation when demodulating the actual data symbol $\alpha_n$.

$$\alpha_n = -j \cdot \alpha_{0,n} \cdot \alpha_{0,n-1}^*$$

This results in a differential BER degradation comparable to that of DPSK as compared to BPSK.

The purpose of the data precoder 12 is to encode the source symbols $\{d_n\}$ prior to the GMSK modulator 13 at the transmitter so that the resulting precoded channel symbols $\{\alpha_n\}$ will render an optimal pseudo symbol sequence $\{a_{0,n}\}$ requiring no differential decoding in the receiver, thereby improving the data demodulation performance. In mathematical terms, the data precoder 12 carries out a data mapping.

$$\alpha_n = f(d_n, d_{n-1}, \ldots, d_0)$$

The data mapping must provide a resulting expression for the pseudo symbol $a_{0,n}$ involving only $d_n$ and not $\{d_i; 0 \leq i \leq n\}$. There is no known systematic routine that can be used to determine such a mapping. Through repeated trial and error, and essentially by chance, one such mapping for 2-ary GMSK signal with modulation index $h=\frac{1}{2}$ has been found.

$$\alpha_n = d_n \cdot d_{n-1} = [d_n - d_{n-1}+1]_{mod4} (\alpha_0 = d_0)$$

This data mapping preserves the transmitted spectrum of the GMSK signal because the precoded symbols $\{\alpha_n\}$ are still equally probable as the source symbols $\{d_n\}$. The data mapping can be implemented in the data precoder 12 through the first 2-ary precoder lookup table.

| First 2-ary Precoder Lookup Table | | |
| --- | --- | --- |
| $d_n$ | $d_{n-1}$ | $\alpha_n = [d_n - d_{n-1} + 1]_{mod4}$ |
| −1 | −1 | +1 |
| −1 | +1 | −1 |
| +1 | −1 | −1 |
| +1 | +1 | +1 |

The data mapping defined by the first 2-ary precoder lookup table results in an optimal pseudo symbol sequence produced by the Viterbi decoder 32.

$$\alpha_{0,n} = j^n \cdot j^{d_n} = j^{n+1} d_n$$

$$\alpha_{1,n} = j^{n-1} \cdot j^{d_n - d_{n-1} + d_{n-2}} = j^n \cdot d_n d_{n-1} d_{n-2}$$

With the decoding states defined as $S_n = (d_n, d_{n-1})$, a $2^2$-state $2^3$-branch Viterbi algorithm is sufficient for demodulating source symbols $\{d_n\}$ when two 2-ary matched-filters are used in the filter bank 28.

A second 2-ary data preceding mapping for 2-ary GMSK signal with a modulation index $h=\tfrac{1}{2}$ has also been found.

$$\alpha_n = (-1)^n \cdot d_n \cdot d_{n-1} = (-1)^n \cdot [d_n - d_{n-1} + 1]_{mod4} (\alpha_0 = d_0)$$

The second data precoding mapping also preserves the transmit spectrum of the GMSK signal, and can be implemented in the data precoder 12 through the second 2-ary precoder lookup table.

| Second 2-ary Precoder Lookup Table | | | |
| --- | --- | --- | --- |
| $d_n$ | $d_{n-1}$ | $\alpha_n = [d_n - d_{n-1} + 1]_{mod4}$<br>n: even | $-\alpha_n = [d_n - d_{n-1} + 1]_{mod4}$<br>n: odd |
| −1 | −1 | +1 | −1 |
| −1 | +1 | −1 | +1 |
| +1 | −1 | −1 | +1 |
| +1 | +1 | +1 | −1 |

The data mapping defined by the second 2-ary precoder lookup table results in an optimal pseudo symbol sequence produced by the Viterbi decoder 32.

$$a_{0,n} = \begin{cases} j \cdot d_n; & n: \text{even} \\ d_n; & n: \text{odd} \end{cases}$$

$$a_{1,n} = \begin{cases} -d_n \cdot d_{n-1} \cdot d_{n-2}; & n: \text{even} \\ -j \cdot d_n \cdot d_{n-1} \cdot d_{n-2}; & n: \text{odd} \end{cases}$$

With the decoding states still defined as $S_n = (d_n, d_{n-1})$, a $2^2$-state $2^3$-branch Viterbi algorithm is again sufficient for demodulating source symbols $\{d_n\}$ when two 2-ary matched filters are used in the filter bank 28. The choice between the first and the second 2-ary data preceding mapping is arbitrary. Extensive simulations of the first and second mappings consistently yield identical demodulation performance.

Extending the 2-ary trellis demodulator to a 4-ary trellis demodulator is based on expressing every 4-ary symbol $\alpha_n \in \{\pm 1, \pm 3\}$ in terms of two 2-ary symbols $\alpha_n^{(0)}$ and $\alpha_n^{(1)}$.

$$\alpha_n = \alpha_n^{(0)} + 2\alpha_n^{(1)}$$

This 4-ary $\alpha_n$ expression enables any 4-ary GMSK signal to be expressed as a product of two 2-ary GMSK signals with $h^{(0)} = h$ and $h^{(1)} = 2h$ as the modulation indices, respectively.

$$\exp[j\pi h \Sigma_n \alpha_n g(t-nT)] = \exp[j\pi h^{(0)} \Sigma_n \alpha_n^{(0)} g(t-nT)] \times \exp[j\pi h^{(1)} \Sigma_n \alpha_n^{(1)} g(t-nT)]$$

Expressing each 2-ary signal constituent into Laurent representation and combining the product, the baseband 4-ary GMSK signal, for an N symbol long 4-ary data sequence $\{\alpha_n; 0 \leq n \leq N-1\}$, takes an amplitude modulation pulse form. The signal amplitude of $\sqrt{(2E/T)}$ is taken as one.

$$z_b(t) = \exp\left\{j\pi h \cdot \sum_n \alpha_n \cdot g(t-nT)\right\} = \sum_{k=0}^{P-1} \sum_{n=0}^{N-1} b_{k,n} \cdot f_k(t-nT)$$

The term $P = 3Q^2$ is the total number of 4-ary amplitude modulated pulses $\{f_k(t)\}$, and the terms $\{b_{k,n}\}$ are the 4-ary pseudo symbols associated with the 4-ary data sequence $\{\alpha_n\}$. All the 4-ary entities can be obtained from respective 2-ary counterparts by following a systematic enumeration approach. The optimal 4-ary trellis demodulator 24 is identical to that for 2-ary GMSK with the following replacements for a $\lambda$ equation and $r_{k,n}$ equation.

$$\lambda^{(m)}(n) \equiv \text{Re}\left[\sum_{k=0}^{P-1} r_{k,n} \cdot b_{k,n}^{(m)*}\right]$$

$$r_{k,n} \equiv \int_{-\infty}^{\infty} z_r(t) \cdot f_k(t-nT) dt = [z_r(t) * f_k(-t)]_{t=nT}$$

The duration of the 4-ary amplitude modulated pulses $\{f_k(t)\}$ is also presented in batches, that is, $D_0 = L+1$, $D_1 = D_2 = L$, $D_3 = \ldots = D_{11} = L-1$. The 4-ary trellis demodulator is simplified by retaining the first $F=1$, $F=3$ or $F=12$ matched filters in the filter bank 28. For the case of $F=3$, the 4-ary matched filters and the corresponding $\lambda$ equation and pseudo symbols can be explicitly expressed.

$$f_0(t) = h_0^{(0)}(t) \cdot h_0^{(1)}(t) \equiv h_0(t; \ h = h^{(0)}) \cdot h_0(t; \ h = h^{(1)})$$

$$f_1(t) = h_0^{(0)}(t+1) \cdot h_0^{(1)}(t) \equiv h_0(t+1; \ h = h^{(0)}) \cdot h_0(t; \ h = h^{(1)})$$

$$f_2(t) = h_0^{(0)}(t) \cdot h_0^{(1)}(t+1) \equiv h_0(t; \ h = h^{(0)}) \cdot h_0(t+1; \ h = h^{(1)})$$

$$\lambda(n) \equiv \text{Re}[r_{0,n} \cdot b_{0,n}^* + r_{1,n} \cdot b_{1,n}^* + r_{2,n} \cdot b_{2,n}^*]$$

$$b_{0,n} = \alpha_{0,n}^{(0)} \cdot \alpha_{0,n}^{(1)} = J^{\alpha_0 + \alpha_1 + \ldots + \alpha_n}$$

$$b_{1,n} = \alpha_{0,n-1}^{(0)} \cdot \alpha_{0,n}^{(1)} = J^{2\alpha_n^{(1)} + \alpha_0 + \alpha_1 + \ldots + \alpha_{n-1}}$$

$$b_{2,n} = \alpha_{0,n}^{(0)} \cdot \alpha_{0,n-1}^{(1)} = J^{\alpha_n^{(0)} + \alpha_0 + \alpha_1 + \ldots + \alpha_{n-1}}$$

The term $J = (j\pi h) = (1+j)/\sqrt{2}$ for the case of $h = \tfrac{1}{4}$. The (0) and (1) terms indicate the modulation index being used for the 2-ary constituents, that is, $h^{(0)} = h$ or $h^{(1)} = 2h$. As in the 2-ary GMSK case, the 4-ary pseudo-symbol $b_{0,n}$ at any stage n also involves prior demodulated symbols, and must resort to the same differential decode operation when demodulating the actual data symbol. Again, through trial and error, two spectrum preserving data preceding mappings have been found for the 4-ary GMSK signal with modulation index $h = \tfrac{1}{4}$.

$$\alpha_n = [d_n - d_{n-1} + 1]_{mod8} (\alpha_0 = d_0)$$

$$\alpha_n = [d_n - d_{n-1} + 3]_{mod\ 8} (\alpha_0 = d_0)$$

These preceding mappings can be implemented in the data precoder 12 through the 4-ary precoder lookup table.

4-ary Precoder Lookup Table

| $d_n$ | $d_{n-1}$ | $\alpha_n = [d_n - d_{n-1} + 1]_{mod8}$ | $\alpha_n = [d_n - d_{n-1} + 3]_{mod8}$ |
|---|---|---|---|
| −3 | −3 | +1 | +3 |
| −3 | −1 | −1 | +1 |
| −3 | +1 | −3 | −1 |
| −3 | +3 | +3 | −3 |
| −1 | −3 | +3 | −3 |
| −1 | −1 | +1 | +3 |
| −1 | +1 | −1 | +1 |
| −1 | +3 | −3 | −1 |
| +1 | −3 | −3 | −1 |
| +1 | −1 | +3 | −3 |
| +1 | +1 | +1 | +3 |
| +1 | +3 | −1 | +1 |
| +3 | −3 | −1 | +1 |
| +3 | −1 | −3 | −1 |
| +3 | +1 | +3 | −3 |
| +3 | +3 | +1 | +3 |

The first preceding mapping $\alpha_n=[d_n-d_{n-1}+1]_{mod8}$ results in an optimal pseudo symbol sequences produced by the Viterbi decoder 32.

$$b_{0,n} = J^n \cdot J^{d_n}$$

$$b_{1,n} = J^{n-1} \cdot J^{d_{n-1}+2\alpha_n^{(1)}}$$

$$b_{2,n} = J^{n-1} \cdot J^{d_{n-1}+\alpha_n^{(0)}}$$

The term $J^n$ belongs to the set $\{\pm1, \pm j, (\pm1\pm j)/\sqrt{2}\}$, and both $\alpha_n^{(0)}$ and $\alpha_n^{(1)}$ are deterministic functions of $d_n$ and $d_{n-1}$. Similarly, the second preceding mapping $\alpha_n=[d_n-d_{n-1}+3]_{mod8}$ results in an optimal pseudo-symbol sequence produced by the Viterbi decoder 32.

$$b_{0,n} = J^{3n} \cdot J^{d_n}$$

$$b_{1,n} = J^{3n-3} \cdot J^{d_{n-1}+2\alpha_n^{(1)}}$$

$$b_{2,n} = J^{3n-3} \cdot J^{d_{n-1}+\alpha_n^{(0)}}$$

In both cases, with the decoding state defined as $S_n=(d_n)$, a $4^1$-state $4^2$-branch Viterbi algorithm is sufficient for demodulating the source symbols $\{d_n\}$ when three 4-ary matched-filters are used in the filter bank 28.

Figure 2:
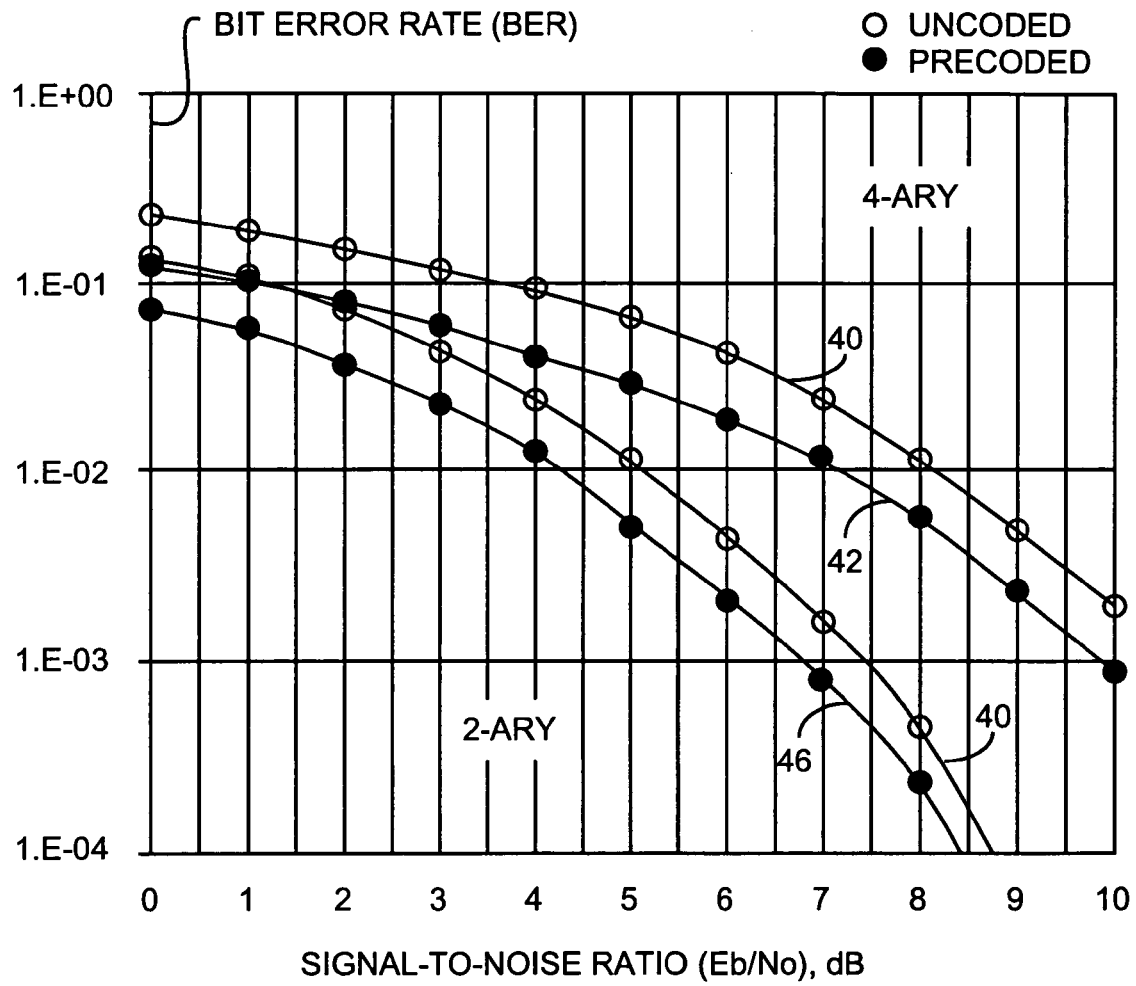
FIG. 2 is bit error rate (BER) performance graph for precoded and non-precoded GMSK communication links using a Gaussian filter having a bandwidth time product of BT=⅓.

FIG. 2 quantified the performance improvement achieved through the data precoding for both the 2-ary and 4-ary GMSK signals with BT=⅓. Simulation data show that, depending on the channel bit-error-rate of interest, a GMSK modem employing data precoding will render a 0.5 dB to 2.5 dB signal-to-noise ratio (SNR) enhancement over the same modem that employs no data precoding.

The function of the precoder 12 in the GMSK transmitter 10 is to precondition the symbol sequence $\alpha_k$ as an effective reverse function of differential encoding that intrinsically results from the GMSK modulation process. The preceding produces absolute phase demodulation achieved within the GMSK receiver 20. This absolute phase demodulation eliminates the need for differential decoding of matched filters 28 while providing an improvement in signal detection performance. The preferred preceding algorithms are specific to M-ary CPM signals.

The present invention is directed to the preceding of a data sequence into an encoded sequence of transmitted symbols, to avoid differential decoding and for improving the BER using Laurent filtering. In the preferred form, a precoder is applied to 2-ary and 4-ary symbol sets used in a GMSK transmitter having a Gaussian filter defines by respective BT products and frequency modulator modulation indices. The preferred GMSK receivers included matched filters 28, sampling 30, and Viterbi decoding 32. The general form of the invention is a precoding method applicable to any M-ary symbol set, BT product, modulation index, bank of match filters, and Viterbi decoding algorithms. Those skilled in the art can make enhancements, improvements and modifications to the invention, and these enhancements, improvements and modifications may nonetheless fall within the spirit and scope of the following claims.

The invention claimed is:

1. A method for communicating a data stream, the method comprising the steps of,
   generating a sequence of data symbols from the data stream,
   precoding the sequence of data symbols into a sequence of precoded data symbols,
   modulating the sequence of precoded data symbols into a continuous phase modulated signal,
   transmitting the continuous phase modulated signal,
   receiving the continuous phase modulated signal, and
   filtering the continuous phase modulated signal into a sequence of filtered signals having absolute phase for indicating the sequence of data symbols, wherein,
   the generating step comprises the steps of receiving the data stream of data bits, formatting the data stream into the sequence of formatted data pulses as a sequence of data symbols within an M-ary symbol set,
   the modulating step comprises the steps of Gaussian filtering and frequency modulating for generating the continuous phase modulated signal, the Gaussian filter step filters the precoded sequence of data symbols into pulse responses continuously accumulated over a finite memory time as a filter response, the Gaussian filtering step is defined by a bandwidth time product inversely defining the finite memory time, the frequency modulating step frequency modulates a carrier reference by the filter response by a modulation index for converting the filter response into the continuous phase modulated signal,
   the continuous phase modulated signal is up converted from baseband during the transmitting step and is down converted to baseband during the receiving step using a local carrier, and
   the filtering step is a matched filtering step for matched filtering of the received continuous phase modulated signal into the filtered signal, the matched filtering is matched by pulse amplitude modulation representation to the Gaussian filtering step, the filtered signal has an absolute phase at a periodic sampling time for indicating the sequence of data symbols.

2. The method of claim 1 further comprising the steps of,
   sampling the sequence of filtered signals into a sequence of sampled symbols, and
   demodulating the sequence of sampled symbols into an estimated data stream.

3. The method of claim 1 wherein,
   the modulation index is equal to a fraction selected from a group consisting of 1/M and (1−1/M) fractions for the M-ary symbol set where M=$2^k$ and k is an integer.

4. A method for communicating a data stream, the method comprising the steps of,
   generating a sequence of data symbols from the data stream by formatting the data stream into the sequence of formatted data pulses as a sequence of data symbols within a 2-ary symbol set,
   precoding the sequence of data symbols into a sequence of precoded data symbols, Gaussian filtering the precoded sequence of data symbols into pulse responses continuously accumulated over a finite memory time as a filter response, the Gaussian filtering is defined by a bandwidth time product inversely defining the finite memory time, frequency modulating a carrier reference by the filter response by a modulation index for converting the filter response into a continuous phase modulated signal, and matched filtering the received continuos phase modulation signal into a filtered signal, the matched filtering is matched by pulse amplitude modulation representation to the Gaussian filtering, the filtered signal has an absolute phase at a periodic sampling time for indicating the sequence of data symbols.

5. The method of claim 4, wherein,
the sequence of data symbols has a data symbol $d_n$ at a current symbol time n where n is an integer and has a data symbol $d_{n-1}$ at an immediate previous symbol time n−1 for precoding the data sequence into the sequence precoded data symbols having a precoded data symbol $\alpha_n$ at the current symbol time, the precoding step is defined by $\alpha_n = [d_n - d_{n-1} + 1]_{mod 4}$.

6. The method of claim 4 wherein,
the sequence of data symbols has a data symbol $d_n$ at a current symbol time n where n is an integer and has a data symbol $d_{n-1}$ at an immediate previous symbol time n−1 for precoding the data sequence into the sequence of precoded data symbols having a precoded data symbol $\alpha_n$ at the current symbol time for even symbol times and for odd symbol times, the precoding step is defined by $\alpha_n = [d_n - d_{n-1} + 1]_{mod 4}$ for even symbol times and $\alpha_n = -[d_n - d_{n-1} + 1]_{mod 4}$ for odd symbol times.

7. The method of claim 4 wherein the modulation index is ½.

8. The method of claim 4 wherein the bandwidth time product is ⅓.

9. The method of claim 4 wherein the filtering step is a matched filtering step for applying a principal Laurent function to the baseband signal so that the filtered signal comprises a principal Laurent component.

10. A method for communicating a data stream, the method comprising the steps of,
generating a sequence of data symbols from the data stream by formatting the data stream into the sequence of formatted data pulses as a sequence of data symbols within a 4-ary symbol set, precoding the sequence of data symbols into a sequence of precoded data symbols, Gaussian filtering the precoded sequence of data symbols into pulse responses continuously accumulated over a finite memory time as a filter response, the Gaussian filtering is defined by a bandwidth time product inversely defining the finite memory time, frequency modulating a carrier reference by the filter response by a modulation index for converting the filter response into a continuous phase modulated signal, matched filtering the continuous phase modulated signal into a filtered signal, the matched filtering is matched by pulse amplitude modulation representation to the Gaussian filtering, the filtered signal has an absolute phase at a periodic sampling time for indicating the sequence of data symbols, and demodulating the sequence of data symbols into an estimate of the data steam.

11. The method of claim 10, wherein,
the sequence of data symbols has a data symbol $d_n$ at a current symbol time n and has a data symbol $d_{n-1}$ at an immediate previous symbol time n−1 for precoding the data sequence into the sequence precoded data symbols having a precoded data symbol $\alpha_n$ at the current symbol time, the precoding step is defined by $\alpha_n = [d_n - d_{n-1} + 1]_{mod 8}$.

12. The method of claim 11 wherein the precoded data symbol $\alpha_n$ is defined by the 4-ary symbol set of +1, −1, +3 and −3.

13. The method of claim 11 wherein the modulation index is ¼.

14. The method of claim 10, wherein,
the sequence of data symbols has a data symbol $d_n$ at a current symbol time n and has a data symbol $d_{n-1}$ at an immediate previous symbol time n−1 for precoding the data sequence into the sequence precoded data symbols having a precoded data symbol $\alpha_n$ at the current symbol time, the precoding step is defined by $\alpha_n = [d_n - d_{n-1} + 3]_{mod 8}$.

15. The method of claim 14 wherein the precoded data symbol $\alpha_n$ is defined by the 4-ary symbol set of +1, −1, +3 and −3.

16. The method of claim 14 wherein the modulation index is ¼.

17. The method of claim 10 wherein the filtering step is a matched filtering step for applying a principal Laurent function, a third Laurent function and a twelfth Laurent function to the baseband signal so that the filtered signal comprises a principal Laurent component, a third Laurent component and a twelfth Laurent component.

18. The method of claim 10 wherein the modulation index is ¾.

19. The method of claim 10 wherein the bandwidth time product is ⅓.

* * * * *